United States Patent [19]

Melcher et al.

[11] Patent Number: 4,932,487

[45] Date of Patent: Jun. 12, 1990

[54] ELECTRONIC BALANCE WITH CALIBRATING WEIGHT CIRCUIT

[75] Inventors: Franz-Josef Melcher, Hardegsen; Dieter Berthel, Göttingen; Günther Maaz, Uslar; Christian Oldendorf, Göttingen, all of Fed. Rep. of Germany

[73] Assignee: Sartorius GmbH, Gottingen, Fed. Rep. of Germany

[21] Appl. No.: 395,983

[22] Filed: Aug. 21, 1989

[51] Int. Cl.⁵ .................... G01G 19/52; G01G 21/28; G01L 25/00
[52] U.S. Cl. ..................................... 177/50; 177/180; 73/1 B
[58] Field of Search .......................... 177/50, 212, 180; 73/1 B

[56] References Cited

U.S. PATENT DOCUMENTS

| | | | |
|---|---|---|---|
| 3,986,012 | 10/1976 | Loshbough et al. | 177/165 X |
| 4,156,361 | 5/1979 | Melcher et al. | 73/1 B |
| 4,343,373 | 8/1982 | Stadler et al. | 177/50 |
| 4,425,975 | 1/1984 | Luchinger | 177/50 |
| 4,751,661 | 6/1988 | Amacher et al. | 73/1 B X |
| 4,766,965 | 8/1988 | Luchinger | 177/50 |
| 4,850,442 | 7/1989 | Naito et al. | 177/164 |

Primary Examiner—George H. Miller, Jr.
Attorney, Agent, or Firm—Eric P. Schellin

[57] ABSTRACT

An electronic balance with a calibrating weight circuit and with a digital processing unit for the automatic drive of the calibrating weight circuit that includes a proximity sensor is built into the balance and that the automatic drive of the calibrating weight circuit by the digital signal processing unit be blocked as soon as the proximity sensor emits an output signal.

7 Claims, 2 Drawing Sheets

ELECTRONIC BALANCE WITH CALIBRATING WEIGHT CIRCUIT

BACKGROUND OF THE INVENTION

The invention relates to an electronic balance with a calibrating weight circuit and with a digital signal processing unit for the automatic drive of the calibrating weight circuit.

Electronic balances of this type are known e.g. from DE-OS No. 36 39 521.

However, the result of the automatic calibration is only reliable if no manipulation to the balance takes place during the calibrating process and also if no disturbance, e.g. by a draft of air, occurs. DE-OS No. 37 14 540 has therefore suggested already that the measuring results of the balance be monitored; if no change in load is determined thereby during a certain time period, then it is assumed that no weighing will be performed in the following time period either. However, this assumption is very uncertain.

SUMMARY OF THE INVENTION

The invention therefore has the problem of further developing a balance of the initially mentioned type in such a manner that a disturbance of the automatic calibration is excluded with greater assurance.

By means of the inclusion of a proximity or approach sensor, the approach of an operating person to the balance is detected in an early manner and the start of a calibration can be blocked or a running calibration can generally be terminated before the operator loads the balance scale with material to be weighed.

In order that the automatic calibration is not started in a short measuring pause, the digital signal processing unit advantageously comprises memory elements in which the output signals of the proximity sensor are continuously stored and can be erased again after a certain time and the automatic drive of the calibrating weight circuit is also blocked if a response of the proximity sensor is stored in the memory elements.

If the balance has a "stand-by" switch position, the proximity sensor is advantageously cut out in this switch position so that the automatic drive of the calibrating weight circuit is always possible. The operator indicates by selecting the "stand-by" switch position that he does not intend to perform any weighings in the near future.

In balance with a motor-driven windscreen the proximity sensor is also used with advantage to drive the windscreen. To this end, the proximity sensor comprises two switching thresholds and when the first switching threshold is exceeded, the automatic drive of the calibrating weight circuit is blocked and when the second switching threshold is exceeded—at a closer approach of the operator—the motor-driven windscreen is driven.

If the digital signal processing unit attempts to drive the calibrating weight circuit but is prevented from doing this by the output signal of the proximity sensor, then a symbol is driven with advantage in the display range so that the operator can initiate the calibration manually if he considers this to be advantageous.

Various types of proximity sensors are generally known. Vibration sensors are also suited for the present purpose since the motion of the operator is always associated with vibrations of the site upon which the balance is placed. The measuring system of the balance can be directly used with advantage as vibration sensor by evaluating the alternating-current component of the measuring signal.

BRIEF DESCRIPTION OF THE DRAWINGS

The invention is described in the following with reference made to the schematic figures.

DETAILED DESCRIPTION OF THE INVENTION

Figure 1:
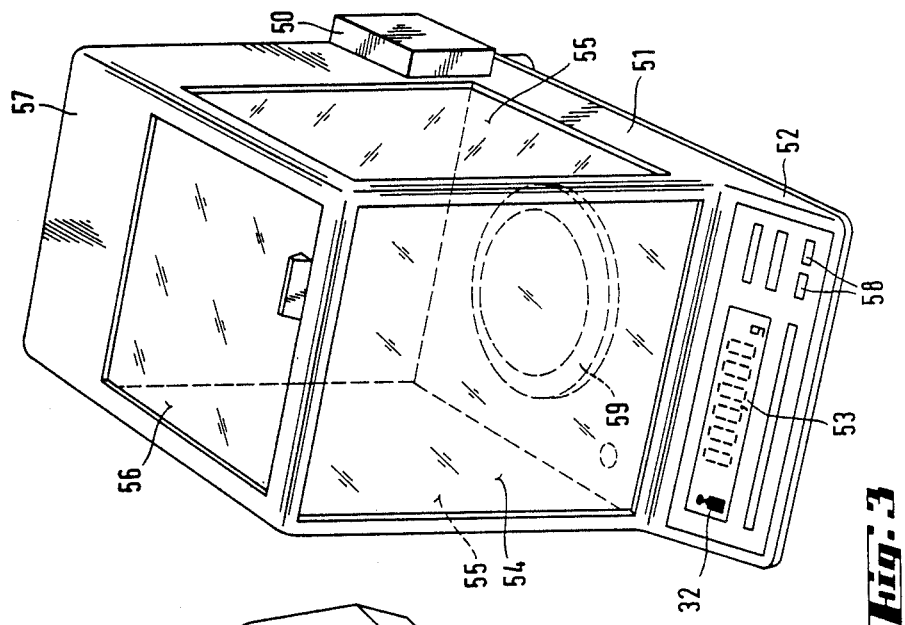
FIG. 1 shows a perspective external view of the balance.

The perspective external view of the balance in FIG. 1 shows the housing with lower part 35 and upper part 34, balance scale 3, display 19 as a result of weighing, tare key 30, calculator key 31 for a manual release of the calibrating process, a symbol 32 in the form of a weight and capacitive approach sensor 45'. The operation of the individual parts will be explained in more detail subsequently in conjunction with FIG. 2.

Figure 2:
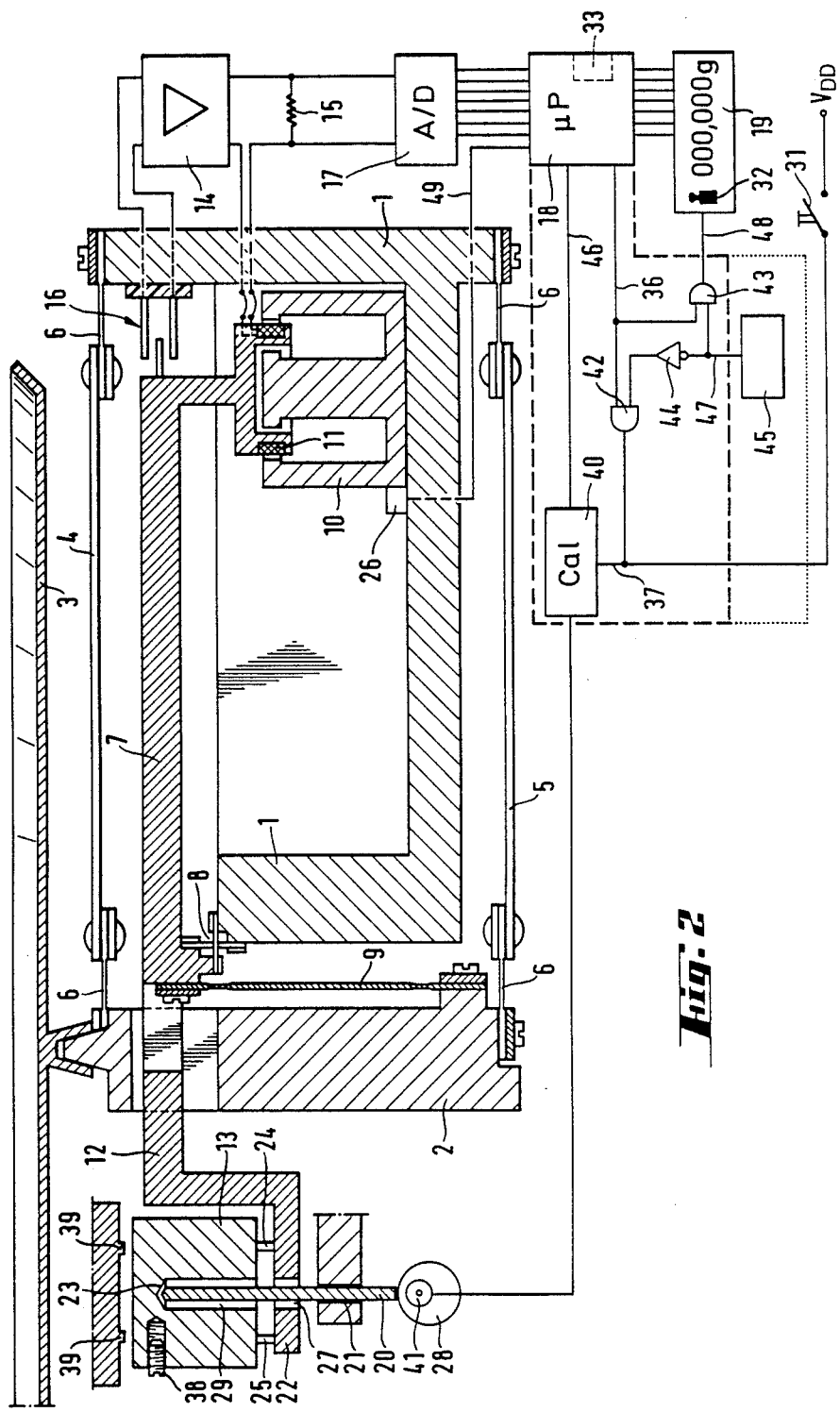
FIG. 2 shows a vertical section through the weighing system of the balance and a block wiring diagram of the associated electronic circuitry.

FIG. 2 shows a vertical section through the weighing system of the balance of FIG. 1 and a block wiring diagram of the associated electronic circuitry. The balance housing and the voltage supply of the electronic circuitry have been omitted for the sake of clarity as they are non-essential for the invention. The weighing system consists of a system carrier 1 fixed to the housing to which carrier load receiver 2 is fastened via two guide rods 4,5 with moving joints 6 in such a manner that it can move in a vertical direction. Load receiver 2 carries load scale 3 in its upper part for receiving the material to be weighed and transfers the force corresponding to the mass of the material to be weighed via coupling element 9 to the load arm of translation lever 7. Translation lever 7 is mounted to system carrier 1 by cross spring joint 8. A coil shell with coil 11 is fastened to the compensation arm of translation lever 7. Coil 11 is located in the air gap of permanent magnet system 10 and generates the compensation force. The magnitude of the compensation current through coil 11 is regulated thereby in a known manner by position sensor 16 and regulating amplifier 14 which is an automatic gain control amplifier in such a manner that equilibrium prevails between the weight of the material to be weighed and the electromagnetically generated compensation force. The compensation current generates a measuring voltage on measuring resistor 15 which is fed to analog-to-digital converter 17. The digitized result is assumed by digital signal processing unit 18 and digitally displayed in display 19. In addition, temperature sensor 26 is present which converts the temperature of the measured value receiver into a digital signal and feeds it via lead 29 to digital signal processing unit 18. Digital signal processing unit 18 can correct temperature errors of the measured value receiver in this manner.

The load arm of translation lever 7 is extended over and beyond the fastening point of coupling element 9 (12) and runs down in a bent part 22. Three vertical centering pins are fastened to part 22 of which only the two centering pins 24,25 can be recognized in FIG. 2. These centering pins carry calibrating weight 13. The calibrating weight comprises a bore 29 coming from below which widens out into conical area 23. This bore passes precisely through the center of gravity of the calibrating weight so that the conical area lies vertically over the center of gravity of the calibration weight.

FIG. 2 also shows a lifting device for the calibrating weight which device consists of prong 20 which is guided in a vertically movable direction in casing 21 fixed to the housing. The device for moving the prong is indicated only by eccentric 28 and electromotor 41. Prong 20 extends through a hole 27 in part 22 into bore 29 in calibrating weight 13. Prong 20 terminates in the position shown, in which the calibrating weight rests on the centering pins and therewith on translation lever 7/12/22, with its conical tip just below conical area 23. If the prong is raised by eccentric 28, it makes contact with conical area 23, raises calibrating weight 13 off of the translation lever and presses it against stops 39 fixed to the housing. This is the normal position of the calibrating weighing position whereas the lowered position shown in FIG. 2 is assumed only for the calibrating process. The center of gravity of calibrating weight 13 can be slightly shifted by screw 38, which can produce a fine compensation.

If digital signal processing unit 18 recognizes on the basis of its program that a calibration should be carried out—e.g. because the temperature on temperature sensor 26 has changed too greatly since the last calibration—it starts run-off or sequencing control 40 of the calibrating device via lead 36 and 37 (gate 42 is open). Run-off control 40 starts motor 41, waits after calibrating weight 13 has been placed on translation lever 7/12/22 until digital signal processing unit 18 announces the stabilizing of the measured value (standstill) via lead 46 and allows the motor to raise the calibrating weight back into the weighing position; digital signal processing unit 18 calculates and then stores the new calibrating factor.

The previously described parts of the balance are known as state of the art and their design and operation are therefore described only briefly.

In addition, the electronic balance of FIG. 2 comprises proximity sensor 45 which drives gate 42 via inverter 44. Proximity sensor 45 reacts to the approach of persons or objects with an output signal on lead 47. Various designs for proximity or approach sensors are generally known, e.g. capacitive approach sensors, scattered-light approach sensors, approach sensors with electromagnetic waves or ultrasonic waves, so that they do not have to be discussed here. In FIG. 1, the proximity sensor is shown as a capacitive approach sensor with an electrode 45'.

If proximity sensor 45 announces that no person is in the vicinity, the signal on lead 47 is zero and inverter 44 opens gate 42 on its output with a logical "1" so that calibration orders from lead 36 are allowed to pass through to lead 37. However, if the proximity sensor responds, then gate 42 is blocked and run-off control 40 can not be activated by digital signal processing unit 18. If digital signal processing unit 18 requests a calibration, then the latter is therefore not started and instead symbol 32 is driven via gate 43 and lead 48. In this manner the operator obtains the information that a calibrating is actually advantageous. The operator can then, if he desires a calibration, initiate the calibration manually by actuating operating key 31 or by cancelling the response of the proximity sensor and therewith cancelling the calibration block by moving away from the balance.

In order to explain the mode of operation, in FIG. 2 the gates 42,43, inverter 44 and run-off control 40 are shown as discrete components and described as such in the above. Naturally, this area can also be realized in the software as a part of digital signal processing unit 18, as is indicated in dotted lines in FIG. 2.

In an advantageous further development of the concept of the invention, an electric memory element can be interposed between the output of proximity sensor 45 and the input of inverter 44 in FIG. 2 which memory element stores a positive output signal of proximity sensor 45 for a certain time and also blocks gate 42 by that means for a certain time after the last response of the proximity sensor 45. In the integrated software solution, the storage can be realized e.g. by means of a memory area 33 organized as a circulating shift register.

If the balance comprises a "stand-by" switch position, proximity sensor 45 is advantageously cut out in this switch position. A calibration is then always possible during this switch position. A monitoring of the environment is not necessary since the operator has allowed it to be recognized by selecting the "stand-by" switch position that he does not plan any weighings.

A vibration sensor can also be used as the proximity sensor 45. The measuring system of the electronic balance can be used directly as vibration sensor thereby: Vibrations take effect as an alternating voltage component in the measuring signal, which should be a pure direct current at a constant load. In this manner, digital signal processing unit 18 can also assume the function of proximity sensor 45 in the form of a vibration sensor, as is indicated in FIG. 2 in dotted lines.

Figure 3:
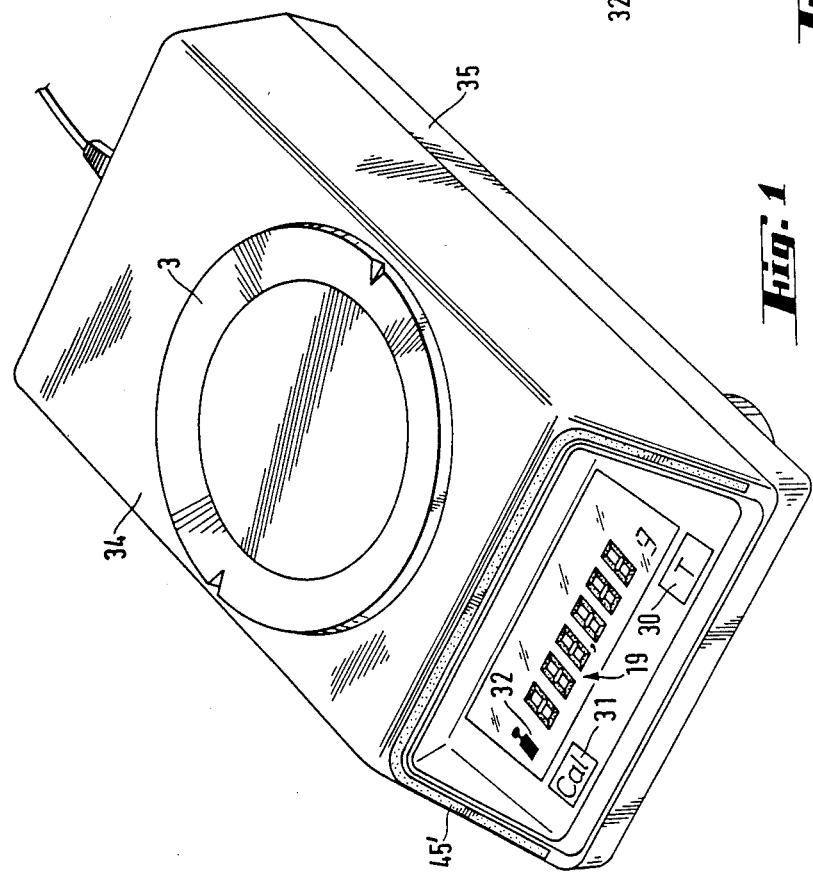
FIG. 3 shows another embodiment of the balance with a motor driven windscreen.

FIG. 3 shows a second embodiment of the electronic balance. The balance comprises a lower housing part 51, a projection 52 for display 53 and for operation elements 58 and a windscreen 54 . . . 57 which protects balance scale 59 and the material to be weighed which is located on it from air currents. The windscreen consists specifically of frame 57, front pane 54 and of two movable side doors 55 and movable cover element 56. By sliding one of side doors 55, the weighing area can be opened by a motor (not shown) and balance scale 59 loaded. An ultrasonic transmitter/receiver 50 is provided in this embodiment as a proximity sensor which radiates short ultrasonic impulses and subsequently receives any echoes. A corresponding approach sensor is located on the other side wall of the balance. The echo signals of successive transmitter impulses are compared with each other and a signal emitted in the case of significant differences. In addition, the ultrasonic approach sensor can also activate the motor-driven opening of side pane 55 of the windscreen in this embodiment: If especially strong echoes occur in the ultrasonic receiver at a short interval in time to the transmitted impulse, this signifies the approach e.g. of a hand of the operator to the corresponding side door 55 of the windscreen and the proximity sensor brings about the opening of this side door.

What is claimed:

1. An electronic balance with a calibrating weight circuit and with a digital signal processing unit for the automatic drive of the calibrating weight circuit, characterized in that a proximity sensor is built into the balance and that the output signal of the proximity sensor blocks the automatic drive of the calibrating weight circuit by the digital signal processing unit.

2. The electronic balance according to claim 1, wherein the digital signal processing unit comprises memory elements in which the output signals of the proximity sensor are continuously stored and can be erased again after a certain time and that the automatic drive of the calibrating weight circuit is also blocked if a response of the proximity sensor is stored in the memory elements.

3. The electronic balance according to claim 2 with a "stand-by" switch position, wherein the proximity sensor is cut out in the "stand-by" switch position.

4. The electronic balance according to claim 1 including a windscreen which can be moved by a motor means, wherein the proximity sensor comprises two switching thresholds, that when the first switching threshold is exceeded, the automatic drive of the calibrating weight circuit is blocked by the digital signal processing unit and that when the second switching threshold is exceeded, the motor-driven windscreen is driven.

5. The electronic balance according to claim 1, wherein a symbol in the display area is driven if the digital signal processing unit drove the calibrating weight circuit and the drive was blocked by the output signal of the approach sensor.

6. The electronic balance according to claim 1, wherein a vibration sensor is used as proximity sensor.

7. The electronic balance according to claim 6, wherein the measuring system of the balance is used as a vibration sensor by using the alternating-voltage component of the measuring signal as a vibration signal.

* * * * *